(12) United States Patent
Sapugay et al.

(10) Patent No.: US 10,977,713 B2
(45) Date of Patent: Apr. 13, 2021

(54) SYSTEMS AND METHODS FOR PRODUCT RECOMMENDATION REFINEMENT IN TOPIC-BASED VIRTUAL STOREFRONTS

(71) Applicant: Paymentus Corporation, Charlotte, NC (US)

(72) Inventors: Edwin Vito Sapugay, Foster City, CA (US); Srinivas Satyasai Sunkara, Sunnyvale, CA (US)

(73) Assignee: PAYMENTUS CORPORATION, Charlotte, NC (US)

(*) Notice: Subject to any disclaimer, the term of this patent is extended or adjusted under 35 U.S.C. 154(b) by 0 days.

(21) Appl. No.: 16/520,704

(22) Filed: Jul. 24, 2019

(65) Prior Publication Data
US 2019/0347709 A1 Nov. 14, 2019

Related U.S. Application Data

(63) Continuation of application No. 14/224,782, filed on Mar. 25, 2014, now Pat. No. 10,366,437.

(60) Provisional application No. 61/805,301, filed on Mar. 26, 2013.

(51) Int. Cl.
*G06Q 30/00* (2012.01)
*G06Q 30/06* (2012.01)

(52) U.S. Cl.
CPC ............... *G06Q 30/0631* (2013.01)

(58) Field of Classification Search
None
See application file for complete search history.

(56) References Cited

U.S. PATENT DOCUMENTS

| | | | |
|---|---|---|---|
| 6,029,195 | A | 2/2000 | Herz |
| 8,676,937 | B2 | 3/2014 | Rapaport et al. |
| 8,918,468 | B1 | 12/2014 | Fisher et al. |
| 9,454,581 | B1 | 9/2016 | Garg et al. |
| 10,664,862 | B1 * | 5/2020 | Szulczewski ...... G06Q 30/0251 |
| 2008/0222283 | A1 | 9/2008 | Ertugrul et al. |
| 2010/0205541 | A1 | 8/2010 | Rapaport et al. |
| 2011/0295826 | A1 | 12/2011 | McLellan |
| 2014/0244686 | A1 | 8/2014 | Tran et al. |

\* cited by examiner

*Primary Examiner* — Mila Airapetian
(74) *Attorney, Agent, or Firm* — Alston & Bird LLP

(57) ABSTRACT

Systems and methods for product recommendation refinement in a topic-based virtual storefront embedded in a topical community web page. The systems and methods facilitate continuous monitoring of user activity and community member activity in the topic-based virtual storefront based on which one or more weighted keywords are derived. A topic set containing various weighted keywords is iteratively configured for extracting and ordering one or more products that are extracted from a plurality of heterogeneous sources.

20 Claims, 3 Drawing Sheets

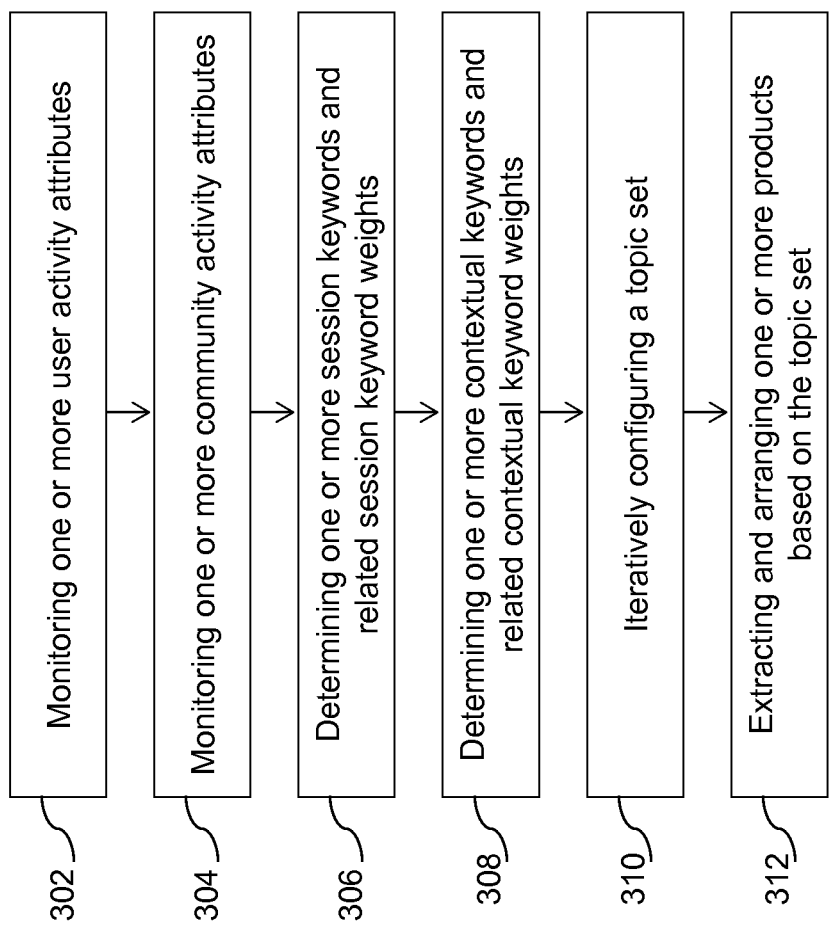

SYSTEMS AND METHODS FOR PRODUCT RECOMMENDATION REFINEMENT IN TOPIC-BASED VIRTUAL STOREFRONTS

CROSS-REFERENCE TO RELATED APPLICATION

This application is a continuation of U.S. application Ser. No. 14/224,782, filed Mar. 25, 2014, which claims benefit to U.S. Provisional Patent Application No. 61/805,301 filed on Mar. 26, 2013, which is incorporated by reference in its entirety.

FIELD OF THE INVENTION

The present disclosure relates generally to online stores, and more particularly, to a method for iteratively filtering product recommendations to be displayed on a virtual storefront.

BACKGROUND OF THE INVENTION

Online shopping is a form of e-commerce, which allows customers to purchase available products without having to go out of their homes to buy products of their choice. Online shopping also provides geographically distributed vendors to connect with their potential customers without having to be physically located near them. At present, a large number of online storefronts are available that are creating a global platform for online shopping. These online store fronts allow users to view a catalogue of products providing them with a wide variety of options to choose from. The transactions also are made through secure encrypted communication pipes, thus, making it secure and comfortable for the customers to shop. Such storefronts may also be provided by embedding the storefronts in a topical online community.

A topical online community may be a blog, a web forum, a social networking website, a video-sharing website, and the like. A topical online community facilitates interaction between one or more groups of people that may share their views towards a topic of common interest. It may be a local or a worldwide community, providing a platform for people from different geographical locations to interact. A topical online community generally contains a plurality of topical community web pages also known as a fan page, a group or channel that contain data related to a particular topic. A member or user of the topical online community may access such a fan page, group or channel and thereon may access data posted on the same. A popular example of a topical online community is Facebook, where friends, acquaintances and the like may interact, share pictures, videos, like fan pages, subscribe to groups of their interest and a lot like it. Another example of a topical online community is YouTube®, which provides a worldwide platform for people to share their videos wherein community members are free to watch or comment on the various videos posted by various people and may also subscribe to a channel related to a topic such as cricket, rock music, and the like. Yet another example is twitter, where the registered users can read, post short messages and comment on short messages.

An online storefront embedded in the topical community may allow the community members to select and pay for an online product of their choice, including providing information about the product features, specifications, appearance, pricing, availability and the like. The community members may also like the product, share the product information, comment regarding the product, and the like. Such an online storefront may provide product recommendations, however, it may happen that the displayed recommendations do not match a customer's requirement or there may be a deviation from that what exactly is needed by the customer. Product recommendations are generally based upon the description and specifications of a product or may also be based upon technical attributes of the product. Another way for recommending products is to provide at least one objective and a subjective measure about a product and then calculating a reputation level from the same measures, thus, displaying a list of products according to the calculated reputation level. It allows a customer to navigate through the highest ranked product towards the lowest one. The products with low reputation level might sometimes be removed from the storefront itself. But, the ratings are subjective in nature and might not represent the true quality of the product. Moreover, at present no mechanism exists that can dynamically and iteratively refine the product recommendations based on various factors such as a change in customer priorities, product availability, marketing campaigns in process for a particular product and the like.

Hence there remains a need for providing a better recommendation mechanism that provides a potential customer with more relevant product recommendations based on various factors that may have a higher probability of turning into a sale. Further, time constraints for a customer to conduct detailed research into various products available make things difficult for him and may reduce chances of a sale. Hence, there is also a need to provide a system and method for providing recommendations and refining such recommendations that enables mapping to the customer requirements in comparatively less time duration. Finally, there is a need for community owners to provide guidance or hints to this recommendation facility to ensure that product recommendations remain germane to the topic or topic sets found in the topical community web page at large. This prevents product recommendations from diverging from community member's interests and ensuring a better and more focused experience for the community members. This becomes extremely important as and when products are sourced from fairly disparate venues.

SUMMARY

It will be understood that this disclosure in not limited to the particular systems, and methodologies described, as there can be multiple possible embodiments of the present disclosure which are not expressly illustrated in the present disclosure. It is also to be understood that the terminology used in the description is for the purpose of describing the particular versions or embodiments only, and is not intended to limit the scope of the present disclosure.

In an embodiment, a system for product recommendation refinement in a topic-based virtual storefront embedded in a topical community web page is described. The system comprises of a plurality of components including a community administrator, a user terminal, a community server, and a storefront server. The community administrator terminal used by a community administrator may be configured for providing one or more core topic keywords, providing user activity parameters, community activity parameters, and an elasticity parameter. The user terminal may be used by a user or one or more community members. The user terminal may be configured for accessing the topic-based virtual storefront and performing one or more user activities. The community server may be configured for monitoring community activities and determining community activity attributes and user activity attributes. The storefront server is communicatively coupled with the community server and one or more store servers and/or marketplace servers. The storefront server is configured for extracting products from one or more stores and/or marketplaces and arranging the products utilizing a recommendation engine. The recommendation engine may be configured for determining one or more session keywords and related session keyword weights based on the one or more user activity attributes and one or more preset user activity parameters. The recommendation engine may also determine one or more contextual keywords and related contextual keyword weights based on the one or more community activity attributes and one or more preset community activity parameters. Further, the recommendation engine may be configured for iteratively configuring a topic set. The iterative configuration of the topic may comprise of extracting the session keywords and contextual keywords in the topic set, and adjusting the weights of one or more core topic keywords, session keywords, contextual keywords based on a total topic set weight and an elasticity parameter, wherein the topic set initially comprises of one or more core topic keywords and one or more core topic keyword weights. In an aspect, the iterative configuration of the topic set may result in expansion or restriction of keywords in the topic set based on user and/or community members' activities. The elasticity parameter may in such cases prevent or allow, in a tightly controlled manner, an overall deviation of product content from the keywords in the core topic set to the keywords in the adjusted topic set.

In an embodiment, a processor implemented method for product recommendation refinement in a topic-based virtual storefront embedded in a topical community web page is described. The method comprises the steps of displaying one or more preset products in the topic-based virtual storefront; continuously monitoring one or more user activity attributes based on user activities related to the one or more preset products in the topic-based virtual storefront; continuously monitoring one or more community activity attributes based on the community member activity; determining one or more session keywords and related session keyword weights based on the one or more user activity attributes and one or more preset user activity parameters; determining one or more contextual keywords and related contextual keyword weights based on the one or more community activity attributes and one or more preset community activity parameters; iteratively configuring a topic set, wherein configuring comprises the steps of: extracting the session keywords and contextual keywords in the topic set, and adjusting the weights of one or more core topic keywords, session keywords, contextual keywords based on a total topic set weight and an elasticity parameter, wherein the topic set initially comprises of one or more core topic keywords and one or more core topic keyword weights; extracting and arranging one or more products based on the topic set.

In another embodiment, another processor implemented method for product recommendation refinement in a topic-based virtual storefront embedded in a topical community web page is described The method comprises the steps of: continuously monitoring one or more user activity attributes based on user activity in the topic-based virtual storefront wherein user activity comprises one or more search keywords provided by the user; continuously monitoring user activity related to one or more specific products/product sets in the storefront wherein user activity may provide the related keywords or product tags a weight higher than weight of the keywords related to other products; continuously monitoring one or more community activity attributes based on community member activity; determining one or more session keywords and related session keyword weights based on the one or more user activity attributes and one or more preset user activity parameters; determining one or more contextual keywords and related contextual keyword weights based on the one or more community activity attributes and one or more preset community activity parameters; iteratively configuring a topic set, wherein configuring comprises the steps of: extracting the session keywords and contextual keywords in the topic set, and adjusting the weights of one or more core topic keywords, session keywords, contextual keywords based on a total topic set weight and an elasticity parameter, wherein the topic set initially comprises of one or more core topic keywords and one or more core topic keyword weights; extracting and arranging one or more products based on the topic set.

It is an object of the present invention to provide a method for dynamic and timely refinement of product recommendations based on customer actions as well as community member actions.

It is an object of the present invention to provide a method for product recommendation that facilitates tight control with respect to core topic deviations for stores/storefronts that want to keep products on-topic or completely allow free topic expansion.

It is an object of the present invention to provide a method for product recommendation that facilitates accommodation of starting community context when deriving product recommendation choices.

BRIEF DESCRIPTION OF THE DRAWINGS

FIG. 3 represents a flow diagram for recommending products to a customer at a virtual topic-based storefront according to a second embodiment.

DETAILED DESCRIPTION

Figure 1:
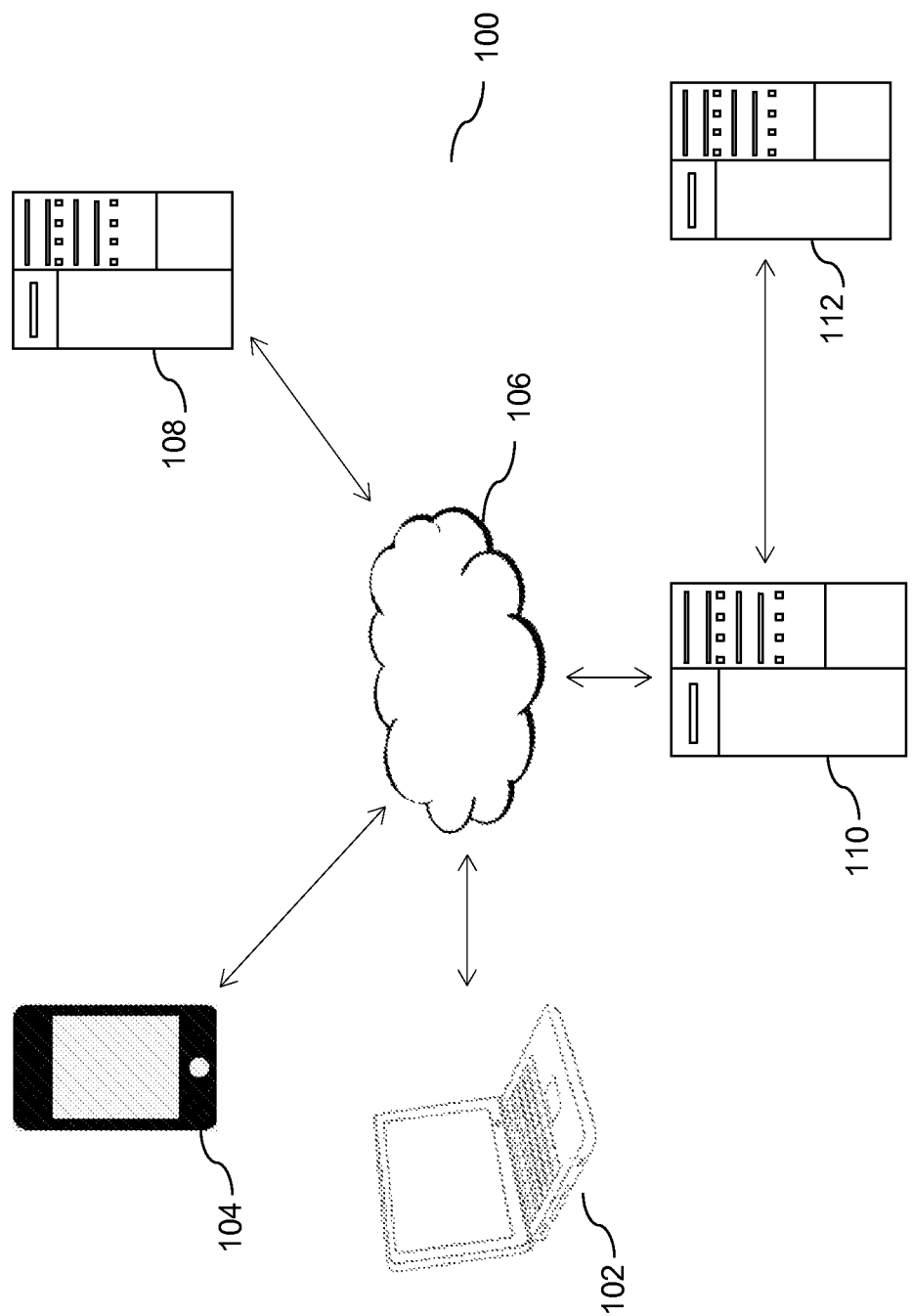
FIG. 1 illustrates a system for recommending products to a customer at a virtual topic-based storefront.

Some embodiments of this invention, illustrating all its features, will now be discussed in detail. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present invention, the preferred, systems and methods are now described.

Embodiments of the present disclosure will be described more fully hereinafter with reference to the accompanying drawings in which like numerals represent like elements throughout the several figures, and in which example embodiments are shown. Embodiments of the claims may, however, be embodied in many different forms and should not be construed as limited to the embodiments set forth herein. The examples set forth herein are non-limiting examples and are merely examples among other possible examples.

A community web page is created by a community administrator or an embedder in a topical community such as Facebook®, YouTube®, Twitter®, a blog, and the like. The community web page may relate to a topic of interest such as an action hero, an actor, a football club, and the like. A plurality of community members that have access to the topical community may become fans or members of one or more topical community web pages upon which the community members get access to the information provided in the topical community web pages. A community member who is also a 'fan' of a topical community web page may receive various informational messages or posts sent by the community administrator or by other 'fans' of the topical community web page. The community administrator upon creating the community web page may decide to embed a virtual storefront in the topical community web page. Such a virtual storefront embedded in the topical community web page may be a topic-based virtual storefront that displays a static product list or enables a community member to conduct a search for one or more products relevant to the topical community web page across a multitude of vendors and marketplaces. For example, a topic-based virtual storefront embedded in a topical community webpage or a fan page for Spiderman may display Spiderman related merchandize. The topical community web page allows a community member to view the product information and purchase the product at the embedded topic-based virtual storefront itself. The community member may also be allowed to like a product, share product information, provide review of a product, and the like. The topic-based virtual storefront may be required to be relevant to the context of the community web page it is embedded in, for example, a storefront embedded in a football club's community web page may be required to display merchandize of that particular club only. Moreover, the storefront may provide one or more product recommendations that are relevant to the context of the community web page. The present disclosure describes systems and methods for providing context relevant product recommendations in a topic-based virtual storefront whereby the products to be displayed are ranked according to one or more factors and the product recommendation is iterative in nature thereby taking current factors into consideration. These recommendations and rankings may then be used to provide a continuously refined display of products to the community members irrespective of whether products are extracted from one vendor source or multiple vendor/marketplace sources.

FIG. 1 illustrates a system for recommending products to a customer at a virtual topic-based storefront. The system comprises of a plurality of components including a community administrator terminal (102), a user terminal (104), a community server (108), and a virtual storefront server (110). A community administrator by means of the community administrator terminal (102) creates a topical community web page and embeds a virtual storefront in the same. The community administrator terminal (102) may be a smartphone, laptop, personal computer, and the like being communicatively coupled with the community server (108) by means of internet (106). The community administrator terminal (102) facilitates the community administrator to configure and manage the virtual storefront. The community administrator terminal (102) may also facilitate configuring the presentation of the products to be displayed in the virtual storefront. For example, a community administrator for a Facebook® fan page by utilizing the community administrator terminal (102) may be enabled to have access to a plurality of applications that synergistically work together for store management and product presentation. Yet, for other community web pages when the virtual storefront is embedded a "code-on-demand" may be provided for managing the virtual storefront. The community server (108) facilitates the display of the community web page and manages various functionalities of the topical community and a plurality of web pages. The community server (108) may also monitor community member activities in the community web page and may store a plurality of statistical information related to the community members as well as the community web pages. A community member also referred to as a user utilizes the user terminal (104) for accessing the various topical community web pages and to perform one or more allowed functions. For example, a user may be allowed to share information provided in a community web page with friends in the topical community. In another example, the user may be allowed to like certain information provided by a topical community web page. The user terminal (104) also enables the user to access the topic-based virtual storefront and interact with the products displayed therein such as purchasing a product, sharing product information, liking a product, and the like. A topic set is created and maintained by a recommendation engine of the virtual storefront server (110) based on which the products may be iteratively extracted, ranked and displayed.

The topic set generally comprises of three set of keywords and related weights of the keywords namely a core topic set, a contextual topic set, and a session topic set. The topic set has a fixed weight that may be either provided manually by the community administrator using the community administrator terminal (102) or may be automatically assigned by the recommendation engine. All the keywords within the topic set are weighted keywords having a related weight. The core topic set is the set of keywords provided by the community administrator. In an aspect, the core topic set comprises keywords that are particularly relevant to a specific virtual storefront deployment. For example, if the topic based storefront is deployed on a community web page focusing on aquariums and fish, the core topic keywords may be "fish, aquarium, cichlids, and reef". The topic based storefront initially displays products that are extracted based on the core topic keywords. The core topic set is a set of keywords provided by the community administrator for enabling the virtual storefront server (110) for extracting an initial set of products that are then displayed at the virtual storefront. For example, the community administrator, upon configuring the virtual storefront embedded in a Spiderman fan page, may provide core topic keywords such as "Spiderman", "superhero", and "boy's room". The core topic keywords may either be provided weights by the community administrator or the weights may be assigned automatically by the virtual storefront server (110) by means of a recommendation engine. The core topic keywords and the related core topic keyword weights enable the recommendation engine to create a topic set. The core topic keywords then may enable extracting products such as Spiderman t-shirts, Spiderman posters, and the like.

The contextual topic set keywords are weighted keywords that are either extracted from the information provided in the community web page or are extracted based on the activities of the community members that are fans of the community web page. For example, if the community web page is a blog then the contextual topic set could be derived from keywords gleaned from the latest blog posts and comments.

The session keywords are the keywords derived based on the user activity such as the activity of one or more community members in the virtual storefront, activity of the community members with respect to the products displayed in the virtual storefront, and the like. In an aspect, the session topic set may derive keywords based on the activity of a store customer as he or she browses the store and the product recommendations. In an aspect, the session topic set is continuously updated based on which products and/or recommendations a store customer actively clicked on, browsed, or purchased. In an aspect, the session topic set may have an internal relevance ranking based on purchases outrank views, or the keywords associated with the most recently viewed products, the keywords associated with previously viewed products.

In an aspect, each product may have one or more associated keywords also known as tags. Products tags may be derived from the product title, product description, and the like. In another aspect, the product tags or keywords associated with products may be explicitly provided by a store or marketplace from where the storefront server sources the same.

The community administrator terminal (102) used by a community administrator may be configured for providing one or more core topic keywords, providing user activity parameters, community activity parameters, and elasticity parameter. In an aspect, the user activity parameters comprise of the weight given to keywords entered by the user, weight given to product tags of the products liked, weight given to product tags of the products shared, weight given to product tags of the products reviewed, weight given to product tags of the products earlier purchased by the user, and the like. In an aspect, the community administrator terminal (102) may also be configured for providing weights for core topic keywords, providing user activity parameters, providing community activity parameters; total topic set weight and elasticity parameter. In an aspect, the elasticity parameter is the parameter for deciding the individual weightage of the sub topic sets within the topic set. For example, the community administrator may decide to give 50% weightage to the core topic keywords, 15% weightage to the contextual keyword set, and 35% weightage to the session keywords. The elasticity parameter restricts the products displayed in the topic-based virtual storefront from going off the topic. In an aspect, elasticity parameters may be set only for one topic subset. In another aspect, the weightage given to the core topic set may be 100%.

The user terminal (104) may be used by a user or one or more community members. The user terminal (104) may be configured for accessing the topic-based virtual store and performing one or more user activities. The community server may be configured for monitoring community activities and determining community activity attributes and user activity attributes. The storefront server (110) is communicatively coupled with the community server (108) and one or more store servers and/or marketplace servers (112). The storefront server is configured for extracting products from one or more stores and/or marketplaces and arranging the products utilizing a recommendation engine. The recommendation engine may be configured for determining one or more session keywords and related session keyword weights based on the one or more user activity attributes and one or more preset user activity parameters. The recommendation engine may also determine one or more contextual keywords and related contextual keyword weights based on the one or more community activity attributes and one or more preset community activity parameters. Further, the recommendation engine may be configured for iteratively configuring a topic set. The iterative configuration of the topic may comprise of extracting the session keywords and contextual keywords in the topic set, and adjusting the weights of one or more core topic keywords, session keywords, contextual keywords based on a total topic set weight and an elasticity parameter, wherein the topic set initially comprises of one or more core topic keywords and one or more core topic keyword weights. In an aspect, the virtual storefront server (110) may be configured for extracting products from one or more store and marketplace server (112) based on the topic set configured by the recommendation engine. The virtual storefront server (110) may also be configured such as to arrange the extracted products based on the topic set configured by the recommendation engine. For example, products may be ranked according to the total weight of the tags related to a product based on the keyword weights present in the topic set.

Figure 2:
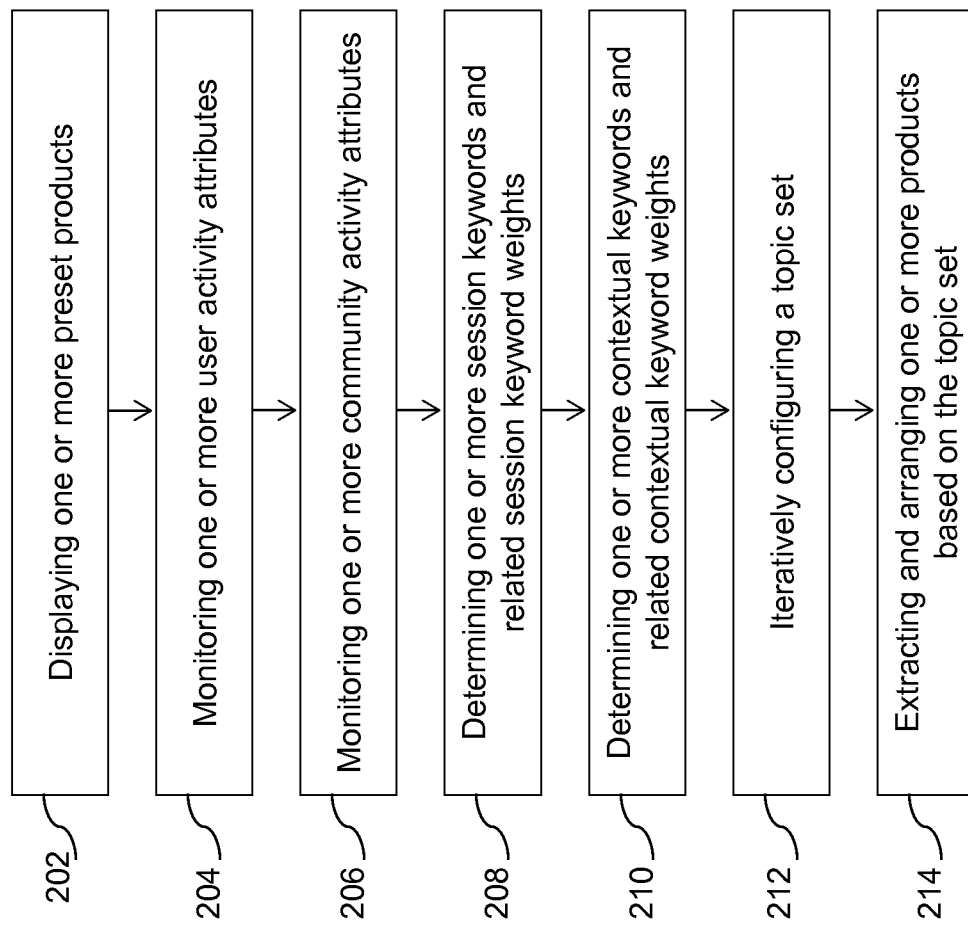
FIG. 2 represents a flow diagram for recommending products to a customer at a virtual topic-based storefront according to a first embodiment.

FIG. 2 represents a flow diagram for recommending products to a customer at a virtual topic-based storefront according to a first embodiment. The flow chart describes a processor implemented method (200) for product recommendation refinement in a topic-based virtual storefront embedded in a topical community web page, according to a first embodiment. The products to be displayed in a storefront may be either statically configured or dynamically configured. The flow chart describes product recommendation in a storefront where static products are displayed. The community administrator enters the core topic keywords, sets one or more user activity parameters, sets one or more community activity parameters, and an elasticity parameter. The core topic keywords are the keywords entered by the administrator while configuring the virtual storefront. In an aspect, the core topic keywords may be closely related to the context of the community web page. For example, if the topic based storefront is embedded in a community web page relating to fishes, then the core topic keywords may be 'fish', 'aquarium', 'cichlids', 'reef', and the like. In an aspect, the user activity parameters may be weight given to product tags of the products liked, weight given to product tags of the products shared, weight given to product tags of the products reviewed, weight given to product tags of the products earlier purchased by the user. In an aspect, the community activity parameters may comprise of keywords extracted from community posts, weight given to product tags of the products liked, weight given to product tags of the products shared, weight given to product tags of the products reviewed, weight given to product tags of the products purchased by the community members. The elasticity parameter is the weightage given to the subtopic sets in the topic set. The elasticity parameter determines the extent to which the products displayed in the topic-based storefront may off topic from the context of the store. For example, if the administrator does not want any products to be based on a user's activity then the weightage given to the core topic set may be 100%. In case, the administer allows the store content to deviate and evolve based off of the end-user/community member's actions, then he may reduce the reserved space to 50 and allow for the evolution of the product content based on the evolving keyword statistics submitted to the topic engine.

The method (200) comprises the steps of displaying one or more preset products (202) in the topic-based virtual storefront. The one or more preset products (202) may be extracted based on core topic keywords provided by the administrator. One or more user activity attributes are continuously monitored (204) based on user activities related to the one or more preset products in the topic-based virtual storefront. For example, a user may like the preset products, purchase the preset products, share a post regarding a preset product.

Moreover, one or more community activity attributes are also continuously monitored (206) based on the community member activity. In an aspect, the community activity attributes may comprise of products liked, shared, commented by a plurality of community members, and the like. In another aspect, the community activity attributes may further comprise of one or more storefront attributes wherein the storefront attributes may comprise of products previously purchased by user, products looked for by user's circle, and products highest purchased.

One or more session keywords and related session keyword weights are extracted (208) based on the one or more user activity attributes and one or more preset user activity parameters. In an aspect, the session keywords may be derived from products liked, shared, and the like by a user.

One or more contextual keywords and related contextual keyword weights (210) are determined based on the one or more community activity attributes and one or more preset community activity parameters. In an aspect, the contextual keywords are keywords either extracted from the posts in a community or activities by community members. For example, if the community web page is a blog page the contextual keywords may be derived from keywords gleaned from the latest blog posts and comments.

The initial topic set contains the weighted core topic keywords provided by the administrator. The topic set is iteratively configured (212), wherein configuring comprises the steps of extracting the session keywords and contextual keywords in the topic set, and adjusting the weights of one or more core topic keywords, session keywords, contextual keywords based on a total topic set weight and an elasticity parameter. The products are then extracted (212) and arranged based on the topic set. The products available for extraction from one or more stores or marketplaces have related tags or keywords. Such keywords are provided a weight based on a preset input provided by the administrator and the weight of keywords in the topic set. For example, each product may be provided a score by summing up the weights of the keywords as found above and may be arranged according to their weight.

FIG. 3 represents a flow diagram for recommending products to a customer at a virtual topic-based storefront configuring the products dynamically according to a second embodiment. The method comprises the steps of continuously monitoring one or more user activity attributes (302) based on user activity in the topic-based virtual storefront wherein user activity comprises one or more search keywords provided by the user. Continuously monitoring one or more community activity attributes (304) based on community member activity. Determining one or more session keywords and related session keyword weights (306) based on the one or more user activity attributes and one or more preset user activity parameters. Determining one or more contextual keywords and related contextual keyword weights (308) based on the one or more community activity attributes and one or more preset community activity parameters. Iteratively configuring a topic set (310), wherein configuring comprises the steps of: extracting the session keywords and contextual keywords in the topic set, and adjusting the weights of one or more core topic keywords, session keywords, contextual keywords based on a total topic set weight and an elasticity parameter, wherein the topic set initially comprises of one or more core topic keywords and one or more core topic keyword weights and finally extracting and arranging (312) one or more products based on the topic set. In an aspect, the elasticity parameter may be set for providing a higher weightage to the core topic keywords as new session keywords are continuously introduced by the user by means of entering keywords for extracting a product based on user requirement and therefore may lead to products that completely off the community web page context. In another aspect, new keywords may be introduced via the keywords and product tags associated with products served up by the stores or marketplace servers as a result of a user search and/or recommendation request.

Although the present invention and its advantages have been described in detail, it should be understood that various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one will readily appreciate from the disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

While for purposes of simplicity of explanation, the illustrated methodologies are shown and described as a series of blocks/steps, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

Software embodiments, which comprise an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, or communicate the program for use by or in connection with the instruction execution system, apparatus, or device. The computer readable medium can be, for example but not limited to, an electronic, magnetic, optical, electromagnetic, infrared, or semiconductor system, apparatus, or device. More specific examples (a non-exhaustive list) of the computer-readable medium would include the following: a portable computer diskette (magnetic), a random access memory (RAM) (electronic), a read-only memory (ROM) (electronic), an erasable programmable read-only memory (EPROM or Flash memory) (electronic), and a portable compact disc read-only memory (CDROM) (optical). In addition, the scope of the present disclosure includes embodying the functionality of the example embodiments of the present disclosure in logic embodied in hardware or software-configured mediums.

The preceding description has been presented with reference to various embodiments. Persons skilled in the art and technology to which this application pertains will appreciate that alterations and changes in the described structures and methods of operation can be practiced without meaningfully departing from the principle, spirit and scope.

What we claim is:

1. A method comprising:
determining one or more session keywords and related session keyword weights based on one or more user activity attributes and one or more preset user activity parameters;
determining one or more contextual keywords and related contextual keyword weights based on one or more community activity attributes and one or more preset community activity parameters;
configuring a topic set by extracting the session keywords and contextual keywords in the topic set and adjusting the weights of one or more core topic keywords, session keywords, contextual keywords based on a total topic set weight and an elasticity parameter, wherein the topic set initially comprises of one or more core topic keywords and one or more core topic keyword weights;
extracting, from a marketplace, one or more products from among a plurality of products based on the topic set; and
presenting said one or more products from among said plurality of products, as one or more product recommendations, to a user.

2. The method of claim 1, wherein user activity attributes further comprises of products liked, products shared, products commented on, and one or more keywords provided for conducting a product search by a user.

3. The method of claim 1, wherein user activity parameters comprise the weight given to keywords entered by the user, weight given to product tags of the products liked, weight given to product tags of the products shared, weight given to product tags of the products reviewed, weight given to product tags of the products earlier purchased by the user, weight given to the product tags of the products returned as a result of the user search and/or recommendation request.

4. The method of claim 1, wherein the community activity attributes comprise of products liked, shared, commented by a plurality of community members.

5. The method of claim 4, wherein the community activity attributes further comprise of one or more storefront attributes.

6. The method of claim 5, wherein the one or more storefront attributes comprise of products previously purchased by user, products looked for by user's circle, and products highest purchased.

7. The method of claim 1, wherein community activity parameters comprise of keywords extracted from community posts, weight given to product tags of the products liked, weight given to product tags of the products shared, weight given to product tags of the products reviewed, weight given to product tags of the products purchased by the community members.

8. The method of claim 1, wherein the total topic set weight, the one or more core topic keywords, weight of the one or more core topic keywords, elasticity parameter are preset.

9. The method of claim 1, wherein the elasticity parameter comprises of core topic keyword weight percentage, contextual keyword weight percentage, session keyword weight percentage.

10. The method of claim 1, wherein the product tags are extracted based on the product name and product description.

11. A method comprising:
displaying one or more preset products in a topic-based virtual storefront;
determining one or more session keywords and related session keyword weights based on one or more user activity attributes and one or more preset user activity parameters;
determining one or more contextual keywords and related contextual keyword weights based on one or more community activity attributes and one or more preset community activity parameters;
iteratively configuring a topic set, wherein configuring comprises:
extracting the session keywords and contextual keywords in the topic set, and
adjusting the weights of one or more core topic keywords, session keywords, contextual keywords based on a total topic set weight and an elasticity parameter, wherein the topic set initially comprises of one or more core topic keywords and one or more core topic keyword weights; and
extracting one or more products from a marketplace server based on the topic set.

12. The method of claim 11, wherein user activity attributes further comprises of products liked, products shared, products commented on, and one or more keywords provided for conducting a product search by a user.

13. The method of claim 11, wherein user activity parameters comprise weight given to product tags of the products liked, weight given to product tags of the products shared, weight given to product tags of the products reviewed, weight given to product tags of the products earlier purchased by the user.

14. The method of claim 11, wherein the community activity attributes comprise of products liked, shared, commented by a plurality of community members.

15. The method of claim 14, wherein the community activity attributes further comprise of one or more storefront attributes.

16. The method of claim 15, wherein the one or more storefront attributes comprise of products previously purchased by user, products looked for by user's circle, and products highest purchased.

17. The method of claim 11, wherein community activity parameters comprise of keywords extracted from community posts, weight given to product tags of the products liked, weight given to product tags of the products shared, weight given to product tags of the products reviewed, weight given to product tags of the products purchased by the community members.

18. The method of claim 11, wherein the elasticity parameter comprises one of a core topic keyword weight percentage, a contextual keyword weight percentage, and a session keyword weight percentage.

19. The method of claim 11, wherein displaying one or more preset products comprise of extracting products from one or more stores and/or marketplaces based on the core topic keywords and the core topic keyword weight.

20. A storefront server configured to be communicatively coupled with a community server and one or more store servers or marketplace servers, said storefront server configured for extracting products from the one or more store servers or one or more marketplace servers, the storefront server comprising:

a recommendation engine configured for
- receiving, from a community administrator terminal, one or more core topic keywords, user activity parameters, community activity parameters, and elasticity parameters;
- receiving, from said community server, community activity attributes and user activity attributes;
- determining one or more session keywords and related session keyword weights based on the one or more user activity attributes and one or more preset user activity parameters;
- determining one or more contextual keywords and related contextual keyword weights based on the one or more community activity attributes and one or more preset community activity parameters; and
- iteratively configuring a topic set by extracting the session keywords and the contextual keywords in the topic set and adjusting the weights of one or more core topic keywords, session keywords, contextual keywords based on a total topic set weight and an elasticity parameter.

\* \* \* \* \*